Figure 1:
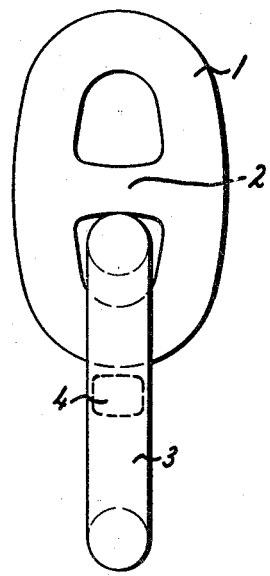

Dec. 26, 1961   G. G. VAN DER WAALS   3,014,340
CHAIN HAVING ALTERNATE LINKS WITH INSERTED
STUDS AND MEANS TO INHIBIT
LOOSENING OF SAID STUDS
Filed Feb. 19, 1959

INVENTOR.
GERRIT GERARDUS VAN DER WAALS

BY
ATTORNEY

United States Patent Office

3,014,340
Patented Dec. 26, 1961

3,014,340
CHAIN HAVING ALTERNATE LINKS WITH INSERTED STUDS AND MEANS TO INHIBIT LOOSENING OF SAID STUDS
Gerrit Gerardus van der Waals, Leiden, Netherlands, assignor to N.V. Koninklijke Nederlandsche Grofsmederij, Leiden, Netherlands
Filed Feb. 19, 1959, Ser. No. 794,448
Claims priority, application Netherlands Feb. 20, 1958
1 Claim. (Cl. 59—78)

Anchor cables consisting of links of substantially the same dimensions mutually, said links having studs provided in them which form one whole with the link body, are generally known. There are also known anchor cables in which the initially loose studs are pressed into the link bodies.

Chains links of the first-mentioned type, the studs of which form one whole with the link body, may be made as a single forged piece, or alternatively the studs, which may or may not be joined to a part of the link body, can for example be welded to the link body to form a unitary structure therewith.

Chains made of such links are very strong, but also very costly.

Cheaper are chains consisting of links of the second type, which are made by placing the stud as an initially loose element between the mutually opposed interior walls of a link body and subsequently pressing the walls of the link body towards each other and against the stud ends.

Cables of the last-mentioned type have the drawback that in consequence of considerable longitudinal and substantially compressive forces due to the laying of the cable, the inserted stud might be pushed out of its position between the link walls, which, if followed by tensile forces, has the major drawback that the then unsupported link walls will be deformed, since they are drawn towards each other. Heaving and slackening an anchor may give rise to disturbances, even to the extent of the cable becoming totally unfit for use. The said laying of the cable may occur while a ship is at anchor and when in consequence of vertical oscillation the cables is repeatedly tensioned to be relieved again immediately thereafter. This also happens when the anchor is eased off and the unrolling speed of the cable exceeds the travelling speed of the anchor.

The aim of the invention is to provide an anchor cable which does not present the drawbacks inherent to cables consisting of links with initially loose studs pressed into them and which anchor cable is nevertheless considerably cheaper than an anchor cable whose links are provided with studs forming one whole with the link bodies.

According to the invention the anchor cable is formed alternately of a link having a stud that forms an integral whole with the link body and of a link having an initially loose stud pressed into it, the studs integrated with the link body being wider than the studs of the other links, in such a way that when the links are in striaght alignment a link can never come into contact with a pressed-in stud of a neighbouring link.

Figure 2:
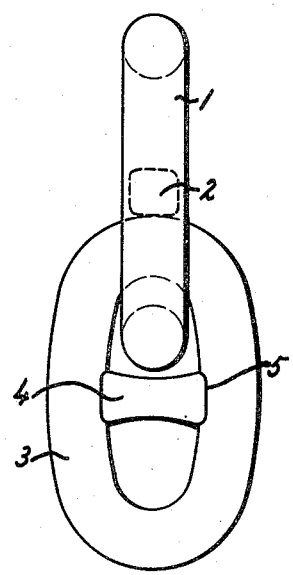

The invention will now be discussed in more detail with reference to the drawing in which:
FIGURE 1 represents a side view and
FIGURE 2 is a front view of a part of the cable according to the invention.

In the cable link 1 the stud 2 forms an integral part of the link body and said link can for example be entirely pressed in a die or said stud may be welded to the link body 1 to form an integral whole therewith. The link 3 is made in a different manner, namely initially without a stud, said stud 4 being subsequently placed as a loose part between the mutually opposed link walls. At the head ends designated by 5 the stud 4 may be adapted to the shape of the link body. By pressing the link walls towards each other the stud 4 can be fastened in the cable link 3 after the link 3 has been inserted into link 1. Obviously the link 3 is initially open for attaching it to the link 1 and to a next following link, which has a fixed stud incorporated in it. The stud 2 is made wider than the stud 4, as is moreover clearly shown by a comparison of FIGURE 1 and FIGURE 2. The stud 2 represented by a dotted line in FIGURE 2 is considerably wider than the stud 4 represented by the dotted line in FIGURE 1. Now, if the cable links are moved towards each other, while the links remain disposed in one straight line, which case is represented in FIGURES 1 and 2, the stud 4 cannot be touched at any time by the adjacent cable links.

Now, if due to circumstances the cable links suddenly move towards each other, the resulting thrusts will be taken up exclusively by the fixed studs 2, whilst the studs 4, which are not incorporated with the cable links, are not subjected to any forces. Thus the said studs 4 are prevented from being pushed out of the links.

I claim:

A link chain comprising a plurality of substantially oval chain links of substantially equal dimensions, said plurality including a first group of links, each comprising a stud extending across the respective link and constituting an integral part thereof and a second group of links each comprising a stud force fitted across the respective link, the links of the two groups being alternately linked to each other, said integral studs having a wider cross section than the force fitted studs, the studs dividing the spaces defined by their respective links in two compartments at opposite ends, the dimensions of each compartment of said first links axially thereof being less than the corresponding dimension of the respective adjacent compartment of said second links to prevent contact between portions of a link including a fixed stud and the force fitted studs of the adjacent links when the links of the chain are in a substantially straight line position.

References Cited in the file of this patent

FOREIGN PATENTS

| 21,355 | Great Britain | Sept. 26, 1906 |
| 829,693 | France | Apr. 19, 1938 |